United States Patent

Maruyama et al.

[11] Patent Number: 5,835,924
[45] Date of Patent: Nov. 10, 1998

[54] LANGUAGE PROCESSING APPARATUS AND METHOD

[75] Inventors: Fuyuki Maruyama; Akira Sai, both of Tokyo, Japan

[73] Assignee: Mitsubishi Denki Kabushiki Kaisha, Tokyo, Japan

[21] Appl. No.: 587,538

[22] Filed: Jan. 17, 1996

[30] Foreign Application Priority Data

Jan. 30, 1995 [JP] Japan .................................. 7-012742

[51] Int. Cl.⁶ .................................................. G06F 17/27
[52] U.S. Cl. .......................................................... 707/535
[58] Field of Search .................................. 707/530–536; 704/2, 4, 8–10

[56] References Cited

U.S. PATENT DOCUMENTS

| 4,193,119 | 3/1980 | Arase et al. | 704/2 |
| 4,608,665 | 8/1986 | Yoshida | 704/3 |
| 5,136,504 | 8/1992 | Fushimoto | 704/10 |
| 5,150,294 | 9/1992 | Tateno | 704/7 |
| 5,276,616 | 1/1994 | Kuga et al. | 704/10 |

FOREIGN PATENT DOCUMENTS 2180973  4/1987  United Kingdom .

OTHER PUBLICATIONS

Development Group for Generally–Used Chinese Word Inputting Method, Pinyinl Chinese Conversion System, Apr. 1, 1989.

*Primary Examiner*—Anton Fetting
*Attorney, Agent, or Firm*—Wolf, Greenfield & Sacks, P.C.

[57] ABSTRACT

A Chinese word inputting apparatus and method converts a Pinyin alphabetic string into a Chinese character, divides the Pinyin alphabetic string input via a keyboard into Chinese syllables by a Chinese word syllabifying mechanism. The input Pinyin alphabetic string is may include a symbol or numeral indicating an unknown portion of the Pinyin alphabetic string and the alphabetic string may include tone data. The Pinyin alphabetic string may also be input in the form of initials, each initial corresponding to a Chinese character. A word boundary setting mechanism determines a word boundary of the input Pinyin alphabetic string by using a list of possible Pinyin alphabetic strings and stored in a dictionary. The input Pinyin alphabetic string is converted into a Chinese word by a Chinese word converting mechanism.

19 Claims, 25 Drawing Sheets

Fig. 3

| EXAMPLE OF PINYIN - CHINESE DICTIONARY ||
|---|---|
| PINYIN ALPHABETIC WRITING | CHINESE WORD |
| ⋮ | |
| beibao | 背包 |
| beibian | 北边 |
| beican | 悲惨 |
| beijing | 北京、背景、背静 |
| beizi | 杯子、辈子 |
| ⋮ | |

Fig. 4

| INPUT EXAMPLE WHERE * IS USED ||||
|---|---|---|---|
| INPUT EXAMPLE 1 | (1) | INTENDED CHARACTER | 東 京 |
| | (2) | CORRESPONDING PINYIN ALPHABETIC STRING | d o n g j i n g |
| | (3) | INPUT | d o * j i * |
| INPUT EXAMPLE 2 | (4) | INTENDED CHARACTER | 北 京 |
| | (5) | CORRESPONDING PINYIN ALPHABETIC STRING | b e i j i n g |
| | (6) | INPUT | b * j * |

Fig. 5

| INPUT EXAMPLE WHERE "?" IS USED |||  |
|---|---|---|---|
| INPUT EXAMPLE 3 | (1) | INTENDED CHARACTER | 長 城 |
| | (2) | CORRESPONDING PINYIN ALPHABETIC STRING | c h a n g c h e n g |
| | (3) | INPUT EXAMPLE | c h ? n g c h ? n g |

Fig. 6

| EXAMPLE WHERE INITIALS WITH TONE DATA ARE INPUTTED |||| 
|---|---|---|---|
| INPUT EXAMPLE 4 | (1) | INTENDED CHARACTER | 日 本 |
| | (2) | CORRESPONDING PINYIN ALPHABETIC STRING | r i b e n |
| | (3) | INPUT EXAMPLE | r 4 b 3 |
| INPUT EXAMPLE 5 | (4) | INTENDED CHARACTER | 航空公司 |
| | (5) | CORRESPONDING PINYIN ALPHABETIC STRING | hangkonggongsi |
| | (6) | INPUT EXAMPLE | h 2 k 1 g 1 s 1 |

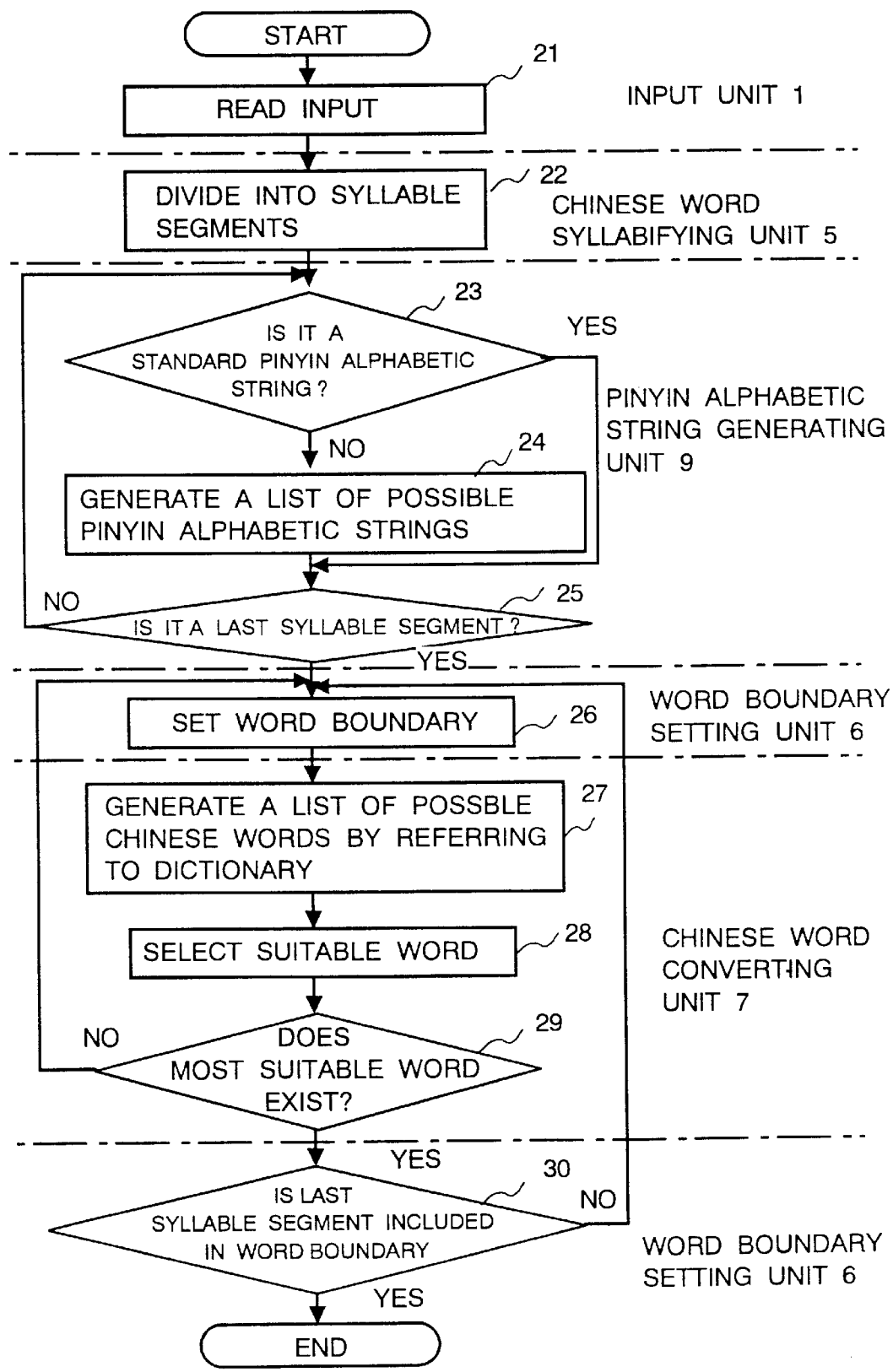

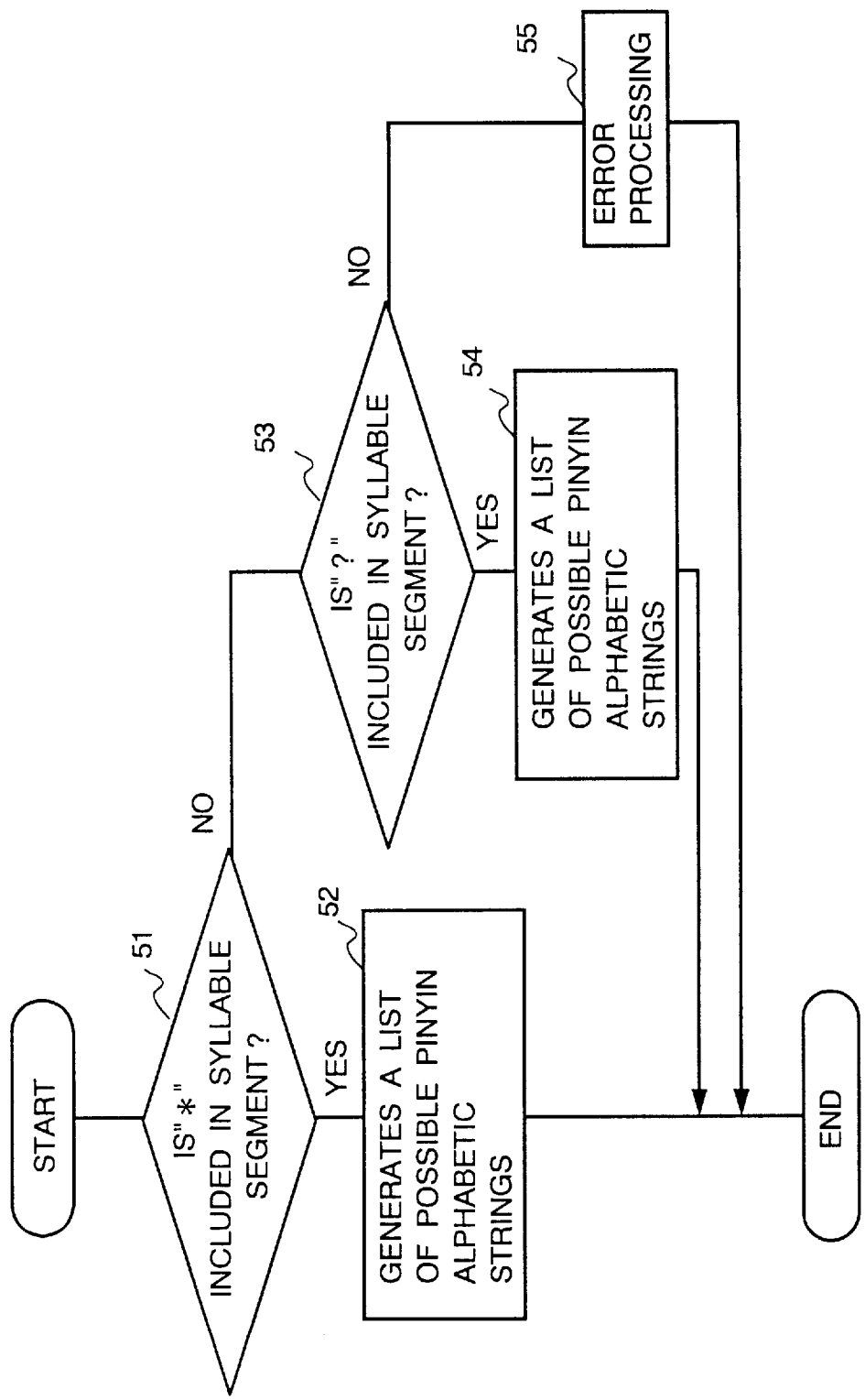

Fig. 9

F : FINALS   IC : INITIAL CONSONANT(S)

| F\IC | \multicolumn{13}{c}{1} |
|---|---|---|---|---|---|---|---|---|---|---|---|---|---|
| IC | a | o | e | -i | er | ai | ei | ao | ou | an | en | ang | eng | ong |
| b | ba | bo | | | | bai | bei | bao | | ban | ben | bang | beng | |
| p | pa | po | | | | pai | pei | pao | pou | pan | pen | pang | peng | |
| m | ma | mo | me | | | mai | mei | mao | mou | man | men | mang | meng | |
| f | fa | fo | | | | | fei | | fou | fan | fen | fang | feng | |
| d | da | | de | | | dai | dei | dao | dou | dan | | dang | deng | dong |
| t | ta | | te | | | tai | | tao | tou | tan | | tang | teng | tong |
| n | na | | ne | | | nai | nei | nao | | nan | nen | nang | neng | nong |
| l | la | | le | | | lai | lei | lao | lou | lan | | lang | leng | long |
| g | ga | | ge | | | gai | gei | gao | gou | gan | gen | gang | geng | gong |
| k | ka | | ke | | | kai | | kao | kou | kan | ken | kang | keng | kong |
| h | ha | | he | | | hai | hei | hao | hou | han | hen | hang | heng | hong |
| j | | | | | | | | | | | | | | |
| q | | | | | | | | | | | | | | |
| x | | | | | | | | | | | | | | |
| zh | zha | | zhe | zhi | | zhai | zhei | zhao | zhou | zhan | zhen | zhang | zheng | zhong |
| ch | cha | | che | chi | | chai | | chao | chou | chan | chen | chang | cheng | chong |
| sh | sha | | she | shi | | shai | shei | shao | shou | shan | shen | shang | sheng | |
| r | | | re | ri | | | | rao | rou | ran | ren | rang | reng | rong |
| z | za | | ze | zi | | zai | zei | zao | zou | zan | zen | zang | zeng | zong |
| c | ca | | ce | ci | | cai | | cao | cou | can | cen | cang | ceng | cong |
| s | sa | | se | si | | sai | | sao | sou | san | sen | sang | seng | song |
| | a | o | e | | er | ai | ei | ao | ou | an | en | ang | | |

Fig. 10

F : FINALS   IC : INITIAL CONSONANT(S)

| IC\F | 2 | | | | | | | | |
|---|---|---|---|---|---|---|---|---|---|
| | i | ia | iao | ie | iou | ian | in | iang | ing | iong |
| b | bi | | biao | bie | | bian | bin | | bing | |
| p | pi | | piao | pie | | pian | pin | | ping | |
| m | mi | | miao | mie | miu | mian | min | | ming | |
| f | | | | | | | | | | |
| d | di | | diao | die | diu | dian | | | ding | |
| t | ti | | tiao | tie | | tian | | | ting | |
| n | ni | | niao | nie | niu | nian | nin | niang | ning | |
| l | li | lia | liao | lie | liu | lian | lin | liang | ling | |
| g | | | | | | | | | | |
| k | | | | | | | | | | |
| h | | | | | | | | | | |
| j | ji | jia | jiao | jie | jiu | jian | jin | jiang | jing | jiong |
| q | qi | qia | qiao | qie | qiu | qian | qin | qiang | qing | qiong |
| x | xi | xia | xiao | xie | xiu | xian | xin | xiang | xing | xiong |
| zh | | | | | | | | | | |
| ch | | | | | | | | | | |
| sh | | | | | | | | | | |
| r | | | | | | | | | | |
| z | | | | | | | | | | |
| c | | | | | | | | | | |
| s | | | | | | | | | | |
| | yi | ya | yao | ye | you | yan | yin | yang | ying | yong |

Fig. 11

F : FINALS    IC : INITIAL CONSONANT(S)

| F\IC | 3 | | | | | | | | 4 | | | |
|---|---|---|---|---|---|---|---|---|---|---|---|---|
| | u | ua | uo | uai | uei | uan | uen | uang | ueng | ü | üe | üan | ün |
| b | bu | | | | | | | | | | | | |
| p | pu | | | | | | | | | | | | |
| m | mu | | | | | | | | | | | | |
| f | fu | | | | | | | | | | | | |
| d | du | | duo | | dui | duan | dun | | | | | | |
| t | tu | | tuo | | tui | tuan | tun | | | | | | |
| n | nu | | nuo | | | nuan | | | | nü | nüe | | |
| l | lu | | luo | | | luan | lun | | | lü | lüe | | |
| g | gu | gua | guo | guai | gui | guan | gun | guang | | | | | |
| k | ku | kua | kuo | kuai | kui | kuan | kun | kuang | | | | | |
| h | hu | hua | huo | huai | hui | huan | hun | huang | | | | | |
| j | | | | | | | | | | ju | jue | juan | jun |
| q | | | | | | | | | | qu | que | quan | qun |
| x | | | | | | | | | | xu | xue | xuan | xun |
| zh | zhu | zhua | zhuo | zhuai | zhui | zhuan | zhun | zhuang | | | | | |
| ch | chu | | chuo | chuai | chui | chuan | chun | chuang | | | | | |
| sh | shu | shua | shuo | shuai | shui | shuan | shun | shuang | | | | | |
| r | ru | | ruo | | rui | ruan | run | | | | | | |
| z | zu | | zuo | | zui | zuan | zun | | | | | | |
| c | cu | | cuo | | cui | cuan | cun | | | | | | |
| s | su | | suo | | sui | suan | sun | | | | | | |
| | wu | wa | wo | wai | wei | wan | wen | wang | weng | yu | yue | yuan | yun |

SYLLABLE SEGMENT 1

SYLLABLE SEGMENT 2

|  | LIST OF POSSIBLE PINYIN ALPHABETIC STRINGS |
|---|---|
| d o * | dong<br>dou |

|  | LIST OF POSSIBLE PINYIN ALPHABETIC STRINGS |
|---|---|
| j i * | jia |
|  | jian |
|  | jiang |
|  | jiao |
|  | jie |
|  | jin |
|  | jing |

Fig. 17

| 東 家 (dongjia) |
| 洞 見 (dongjian) |
| 冬 節 (dongjie) |
| 東 京 (dongjing) |

Fig. 18

|  | LIST OF POSSIBLE PINYIN ALPHABETIC STRINGS |
|---|---|
| ch?ng | chang |
|  | chong |
|  | cheng |

Fig. 19

| |
|---|
| 常常 (changchang) |
| 長城 (changcheng) |
| 衝程 (chongcheng) |

Fig. 20

| INITIALS | TONE DATA | CHINESE | PINYIN ALPHABETIC STRING |
|---|---|---|---|
| r b | 43 | 日 本 | r i b e n |
|  | 23 | 人 保 | r e n b a o |
|  | 44 | 任 便 | r e n b i a n |

Fig. 21

| INITIALS AND TONE DATA | CHINESE | PINYIN ALPHABETIC STRING |
|---|---|---|
| r 2 b 3 | 人 保 | r e n b a o |
| r 4 b 3 | 日 本 | r i b e n |
| r 4 b 4 | 任 便 | r e n b i a n |

Fig. 22

| | | |
|---|---|---|
| INPUT EXAMPLE 6 | INPUT: | d*jing |
| | FINAL CONVERSION RESULT: | 東京 (dongjing) |
| INPUT EXAMPLE 7 | INPUT: | changch?ng |
| | FINAL CONVERSION RESULT: | 長城 (changcheng) |
| INPUT EXAMPLE 8 | INPUT: | r*benr?? |
| | FINAL CONVERSION RESULT: | 日本人 (ribenren) |
| INPUT EXAMPLE 9 | INPUT: | h2kgongsi |
| | FINAL CONVERSION RESULT: | 航空公司 (hangkonggongsi) |

Fig. 23

| | INPUT EXAMPLE WHERE JAPANESE HIRAGANA IS CONVERTED INTO KANJI | |
|---|---|---|
| (1) | INTENDED CHARACTER | 海外 |
| (2) | CORRESPONDING HIRAGANA CHARACTER STRING | かいがい |
| (3) | INPUT EXAMPLE | かいが？ |

Fig. 25

| EXAMPLE OF JAPANESE HIRAGANA - KANJI DICTIONARY ||
|---|---|
| HIRAGANA | KANJI |
| ⋮ | |
| かいが | 絵画 |
| かいがい | 海外 |
| かいがん | 開眼 |
| かいがん | 海岸 |
| ⋮ | |

Fig. 26

| INPUT EXAMPLE WHERE ROMAN LETTERS ARE CONVERTED INTO KANJI | | |
|---|---|---|
| (1) | INTENDED CHARACTER | 海外 |
| (2) | CORRESPONDING ROMAN LETTERS | kaigai |
| (3) | INPUT EXAMPLE | kaig * |

Fig. 27

| EXAMPLE OF ROMAN LETTER - KANJI DICTIONARY ||
|---|---|
| ROMAN LETTER | KANJI |
| ⋮ | |
| kaiga | 絵画 |
| kaigai | 海外 |
| kaigan | 開眼 |
| kaigan | 海岸 |
| ⋮ | |

Fig. 28A RELATED ART

| CONVENTIONAL INPUT EXAMPLE 15 | INPUT CHINESE WORD COMPRISED OF SINGLE CHINESE CHARACTER |
|---|---|
| (1) WITHOUT TONE DATA<br>    INPUT      bian<br>    POSSIBLE CHINESE CHARACTERS: 便、辺、変、…<br><br>(2) WITH TONE DATA<br>    INPUT      bian 1<br>    POSSIBLE CHINESE CHARACTERS: 辺<br><br>    INPUT      bian 4<br>    POSSIBLE CHINESE CHARACTERS: 便、変 | |

Fig. 28B RELATED ART

| CONVENTIONAL INPUT EXAMPLE 16 | INPUT CHINESE WORD COMPRISED OF MORE THAN TWO CHINESE CHARACTERS |
|---|---|
| (1) WITHOUT TONE DATA<br>    INPUT      beijing<br>    POSSIBLE CHINESE CHARACTERS: 北京、背景<br><br>(2) WITH TONE DATA<br>    INPUT      bei3jing1<br>    POSSIBLE CHINESE CHARACTERS: 北京<br><br>    INPUT      bei4jing3<br>    POSSIBLE CHINESE CHARACTERS: 背景 | |

Fig. 28C RELATED ART

| CONVENTIONAL INPUT EXAMPLE 17 | INPUT INITIAL OF PINYIN ALPHABETIC STRING |
|---|---|
| INPUT      zg (zhongguo)<br>POSSIBLE CHINESE CHARACTERS: 中国 | |

Fig. 29 RELATED ART

```
invent
invention
inventive
inventor
inventory
**************************
interactive
```

Fig. 30 RELATED ART

```
m?t mat
        MDT
        met
        MIT
```

LANGUAGE PROCESSING APPARATUS AND METHOD

BACKGROUND OF THE INVENTION

1. Field of the Invention

The present invention relates to a language processing apparatus and method. The invention mainly relates to a Chinese word inputting apparatus and a Chinese word processing method of a computer and a word processor. The Chinese word inputting apparatus and the Chinese word processing method enable easy, efficient input by an operator having limited knowledge of the Chinese Pinyin system and of a correct Pinyin alphabetic string.

2. Conventional Related Art

A Pinyin inputting system has been used in Chinese word processors, with a character pattern cord or GB cord used as an auxiliary input.

Pinyin represents a pronunciation of Chinese characters, using an alphabet system. In Pinyin inputting systems, the pronunciation of Chinese characters is input into the system in Pinyin alphabetic writing via a keyboard and converted into a desired Chinese character string.

Conversion of a Pinyin alphabetic string into a corresponding Chinese character string does not always result in the desired Chinese character string, and a plurality of Chinese character strings corresponding to the same Pinyin alphabetic string may exist. In this situation, the plurality of possible Chinese character strings corresponding to the Pinyin alphabetic string is displayed by the system, and an operator of the system selects a desired character string.

A conventional Pinyin inputting system used in a Chinese word inputting apparatus is described using the following examples:

FIG. 28A illustrates a conventional input example 15. In this example, as there are at least three different Chinese characters corresponding to one Pinyin alphabetic writing input to the system, the operator is required to select a desired Chinese character from the three Chinese characters displayed.

When there are a plurality of Chinese characters corresponding to a Pinyin alphabetic string, tone data representing the accent of a Chinese word is appended to the Pinyin alphabetic string and input to the system. The number of corresponding Chinese characters may be reduced, facilitating the operation of the system to a certain extent. There are five kinds of tone data, each of which is provided with numerical information and is designated by numerals such as, for example, 0 to 4 in accordance with differences of the accent.

FIG. 28B also illustrates a conventional input example 16. As shown in example 16, the Pinyin inputting system using tone data to indicate an accent in a Pinyin alphabetic string is effective when a corresponding Chinese word is comprised of more than two Chinese characters and has a homonym. The tone data do not have to be appended to the entire Pinyin alphabetic string. It may be appended to part of the Pinyin alphabetic string as shown in example 16.

FIG. 28C also illustrates a conventional input example 17 using a Pinyin inputting system similar to that described above. This system, however, utilizes only initials of a Pinyin alphabetic string corresponding to the desired Chinese characters. Therefore, the number of inputting operations can be reduced. This system is especially rendered effective where a desired word is comprised of more than two Chinese characters. In the input example 17, two initials of the Pinyin alphabetic string for the desired word are input. The word corresponding to the two initials is selected from a dictionary of the system.

Another conventional word processing system is disclosed in Japanese Patent Application No. HEI4-167159. The disclosed system also converts an entered Pinyin alphabetic string into a Chinese character string. However, when an incomplete or inaccurate Pinyin alphabetic string is entered by an operator having limited knowledge of Pinyin, the disclosed system cannot convert the Pinyin alphabetic string into the correct Chinese character string.

In the prior art, there also exists an English dictionary retrieval tool for an English word whose spelling is uncertain, called "The American Heritage Dictionary". A user of this tool enters, for example, "invent", when he is not sure of the spelling of a desired word beginning with "invent". As shown in FIG. 29, "The American Heritage Dictionary" searches for words beginning with "invent", and displays them on a display unit. The user, if required, selects any of the words displayed, and refers to the dictionary for its meaning.

FIG. 30 is an example where a word including one arbitrary letter between "m" and "t" is retrieved and displayed by the retrieval tool described above. When the user enters "m?t", several possible words illustrated in FIG. 30 are displayed. A word including an arbitrary letter string between "m" and "t" can also be obtained. When the user enters "m*t", more than 500 possible words corresponding to the above-mentioned letter string are displayed. As described before, the conventional English word retrieval tool displays a large number of possible alphabetical letter strings, among which the user identifies the one he originally desired to select.

However, the above-mentioned retrieval system has the disadvantage that, although it can be applied to a language such as English or French which is represented by a single character form, it may not be applied to a language such as Japanese or Chinese represented by a plurality of character forms. Because, in a language represented by a plurality of character forms, one character form must be converted into another character form.

The term "character form" used herein is defined as "a set of letters or characters used in the writing system of a language".

Hereinafter, kanji or the use of Chinese characters is regarded as one character form, while the use of characters such as Japanese hiragana or katakana, representing the pronunciation of kanji, is regarded as another character form. Japanese Romaji (Roman letters) or Chinese Pinyin, representing the pronunciation of Chinese characters or Chinese words respectively, is also regarded as one character form.

Basically, the conventional Chinese word inputting apparatus and Chinese word processing systems described above do not operate unless the operator knows the correct Pinyin spelling of a word to be input to the system.

When a nonexistent, or incorrect Pinyin alphabetic string is input, it can not be converted into a correct Chinese character string.

In conventional word processing systems such as, for example, the one for processing English which is represented by a single character form, an operator is able to retrieve a desired word easily, even when the operator is not sure of the correct spelling of the word. However, with languages such as Chinese or Japanese which are represented by a plurality of character forms, operators of word processing systems cannot obtain the correct outputted character form unless they knows the correct spelling of the character form to be entered.

SUMMARY OF THE INVENTION

The present invention is made to solve the above-mentioned problems. It is, therefore, an object of the present invention to provide a Chinese word inputting apparatus and a Chinese word processing method which enable easy and efficient input by an operator having limited knowledge of the Pinyin system, e.g., having limited knowledge of the finals of a Chinese word. The term "finals" used herein is employed to mean "a main vowel with or without a final consonant or a semivowel after an initial consonant or consonant cluster of a Chinese syllable".

Further, it is another object of the present invention to provide a Chinese word inputting apparatus and a Chinese word processing method that are compatible with conventional Pinyin inputting systems, and which enable easy and efficient input for both the conventional Pinyin inputting systems and the one according to the present invention.

It is a further object of the present invention to provide a language processing apparatus and a language processing method which enable easy and efficient input when it is required to convert one character form of an input language word into another.

To achieve the foregoing objects, according to one aspect of the present invention, a Chinese word inputting apparatus for inputting an alphabetic string and for converting the alphabetic string into a Chinese character string may comprise:

(a) input means for inputting the alphabetic string, the alphabetic string having an unknown portion, and for inputting a symbol indicating an unknown alphabetic string in place of the unknown portion of the alphabetic string;

(b) Chinese word syllabifying means for dividing the alphabetic string input by the input means into Chinese syllable segments;

(c) alphabetic string generating means for determining if each of the Chinese syllable segments is comprised of a standard alphabetic string, so as to output the standard alphabetic string when each of the Chinese syllable segments is comprised of a standard alphabetic string, and to generate and output a possible alphabetic string when the symbol indicating an unknown alphabetic string is used in place of the unknown portion of the input alphabetic string;

(d) dictionary means for storing both Chinese character strings and alphabetic information;

(e) Chinese word converting means for converting the standard alphabetic string into a possible Chinese string and for converting the possible alphabetic string into a possible Chinese character string by referring to the dictionary means; and (f) output means for outputting the possible Chinese character strings converted by the Chinese word converting means.

According to another aspect of the present invention, a Chinese word inputting apparatus for inputting an alphabetic string having one or more letters and for converting the alphabetic string into a Chinese character string may comprise:

(a) input means for inputting the alphabetic string, the alphabetic string having an unknown letter, and for inputting a symbol indicating an unknown letter in place of the unknown letter of the alphabetic string;

(b) Chinese word syllabifying means for dividing the alphabetic string input by the input means into Chinese syllable segments;

(c) alphabetic string generating means for determining if each of the Chinese syllable segments is comprised of a standard alphabetic string, so as to output the standard alphabetic string when each of the Chinese syllable segments is comprised of a standard alphabetic string, and to generate and output a possible alphabetic string when the symbol indicating the unknown letter is used in place of an unknown letter of the input alphabetic string;

(d) dictionary means for storing both Chinese character strings and alphabetic information;

(e) Chinese word converting means for converting the standard alphabetic string into a possible Chinese character string and for converting the possible alphabetic string into a possible Chinese character string by referring to the dictionary means; and (f) output means for outputting the possible Chinese character strings converted by the Chinese word converting means.

According to another aspect of the present invention, a Chinese word inputting apparatus for inputting an alphabetic string and for converting the alphabetic string into a Chinese character string may comprise:

(a) input means for inputting the alphabetic string including an initial letter of the alphabetic string and a symbol indicating tone data appended to the initial letter of the alphabetic string;

(b) Chinese word syllabifying means for dividing the alphabetic string input by the input means into Chinese syllable segments;

(c) dictionary means for storing both Chinese character strings and alphabetic information;

(d) Chinese word converting means for converting the alphabetic string into a possible Chinese character string, and for converting the initial letter and the tone data of the alphabetic string into a possible Chinese character string by using the tone data to reduce a number of possible corresponding Chinese characters; and (e) output means for outputting the possible Chinese character strings converted by the Chinese word converting means.

According to another aspect of the present invention, a Chinese word processing method for inputting an alphabetic string and for converting the alphabetic string into a Chinese character string may comprise steps of:

(a) inputting the alphabetic string, the alphabetic string having an unknown portion, and inputting a symbol indicating an unknown alphabetic string in place of the unknown portion of the alphabetic string;

(b) dividing the alphabetic string into Chinese syllable segments;

(c) determining whether each of the Chinese syllable segments is comprised of a standard alphabetic string so as to output the standard alphabetic string when each of the Chinese syllable segments is comprised of a standard alphabetic string, and to generate and output a possible alphabetic string when the symbol indicating an unknown alphabetic string is used in place of the unknown portion of the input alphabetic string;

(d) converting the standard alphabetic string into a possible Chinese character string and converting the possible alphabetic string into a possible Chinese character string by referring to dictionary means containing both Chinese character strings and alphabetic information; and (e) outputting the possible Chinese character strings.

According to another aspect of the present invention, a Chinese word processing method for inputting an alphabetic string and for converting the alphabetic string into a Chinese character string may comprise steps of:

(a) inputting the alphabetic string, the alphabetic string having one or more letters including an unknown letter, and inputting a symbol indicating an unknown letter in place of the unknown letter of the alphabetic string;

(b) dividing the alphabetic string into Chinese syllable segments;

(c) determining whether each of the Chinese syllable segments is comprised of a standard alphabetic string so as to output the standard alphabetic string when each of the Chinese syllable segments is comprised of a standard alphabetic string, and to generate and output a possible alphabetic string when the symbol indicating an unknown letter is used in place of the unknown letter of the alphabetic string;

(d) converting the standard alphabetic string into a possible Chinese character string and converting the possible alphabetic string into a possible Chinese character string by referring to dictionary means containing both Chinese character strings and alphabetic information; and (e) outputting the possible Chinese character strings.

According to another aspect of the present invention, a Chinese word processing method for inputting an alphabetic string and converting the alphabetic string into a Chinese character string may comprise steps of:

(a) inputting the alphabetic string including an initial letter of the alphabetic string and a symbol indicating tone data appended to the initial letter of the alphabetic string;

(b) dividing the alphabetic string into Chinese syllable segments;

(c) converting the alphabetic string into possible Chinese character strings by using the initial letter and the tone data to reduce a number of possible Chinese character strings; and (d) outputting the possible Chinese character strings.

According to yet another aspect of the present invention, a language processing apparatus for processing a language represented by at least a first character form and a second character form may comprise:

(a) input means for inputting a character string having an unknown portion, represented by the first character form, the character string including a symbol in place of the unknown portion;

(b) character string generating means for determining whether the symbol indicating an unknown portion is used in the character string input by the input means for replacing the symbol by a grammatically possible character string of the first character form to create a possible character string;

(c) dictionary means for storing character strings of the first character form and corresponding character strings of the second character form;

(d) converting means for converting the possible character string represented by the first character form obtained by the character string generating means into a corresponding possible character string represented by the second character form by referring to the dictionary means; and (e) outputting the corresponding possible character string represented by the second character form converted by the converting means.

BRIEF DESCRIPTION OF THE DRAWINGS

The present invention will be described in more detail in conjunction of appended drawings, wherein:

FIG. 3 shows an example of a Pinyin-Chinese dictionary;

FIG. 4 shows input examples using a symbol "*";

FIG. 5 shows an input example using a symbol "?";

FIG. 6 shows input examples using initials with tone data;

FIG. 7 is a flow chart showing an operation of the Chinese word inputting apparatus according to embodiment 1 of the present invention;

FIG. 8 is a detailed flow chart showing an operation of the Chinese word inputting apparatus according to embodiment 1 of the present invention;

FIG. 9 is a table showing standard Pinyin alphabetic strings;

FIG. 10 is a table showing standard Pinyin alphabetic strings;

FIG. 11 is a table showing standard Pinyin alphabetic strings;

FIG. 17 shows a list of possible Chinese words corresponding to "do*", generated by the Chinese word converting unit;

FIG. 18 shows a list of possible Pinyin alphabetic strings corresponding to "ch?ng", generated by the Pinyin alphabetic string generating unit;

FIG. 19 shows a list of possible Chinese words corresponding to "ch?ng", generated by the Chinese word converting unit;

FIG. 20 shows an example of a dictionary separately retaining initial information and tone data as a search key;

FIG. 21 shows a an example of a dictionary retaining an initial and tone data as a search key;

FIG. 22 shows input examples using "*", "?", and "an initial and tone data" in Pinyin alphabetic strings;

FIG. 23 shows an input example using "?" in a hiragana character string;

FIG. 25 shows an example of a Japanese hiragana-kanji dictionary;

FIG. 26 shows an input example using "*" in a Roman letter string;

FIG. 27 shows an example of a Roman letter-kanji dictionary;

FIG. 28A shows a conventional example of inputting Pinyin alphabetic strings;

FIG. 28B shows a conventional example of inputting Pinyin alphabetic strings;

FIG. 28C shows a conventional example of inputting Pinyin alphabetic strings;

FIG. 29 shows a list of words beginning with "invent" displayed by a conventional retrieval tool called "The American Heritage Dictionary"; and FIG. 30 shows a list of words including one arbitrary letter between "m" and "t", displayed by "The American Heritage Dictionary".

DESCRIPTION OF THE PREFERRED EMBODIMENTS

Embodiment 1

This embodiment provides a Chinese word inputting apparatus and a Chinese word processing method which may be operated by an operator having limited knowledge of the Pinyin alphabetic form.

Figure 1:
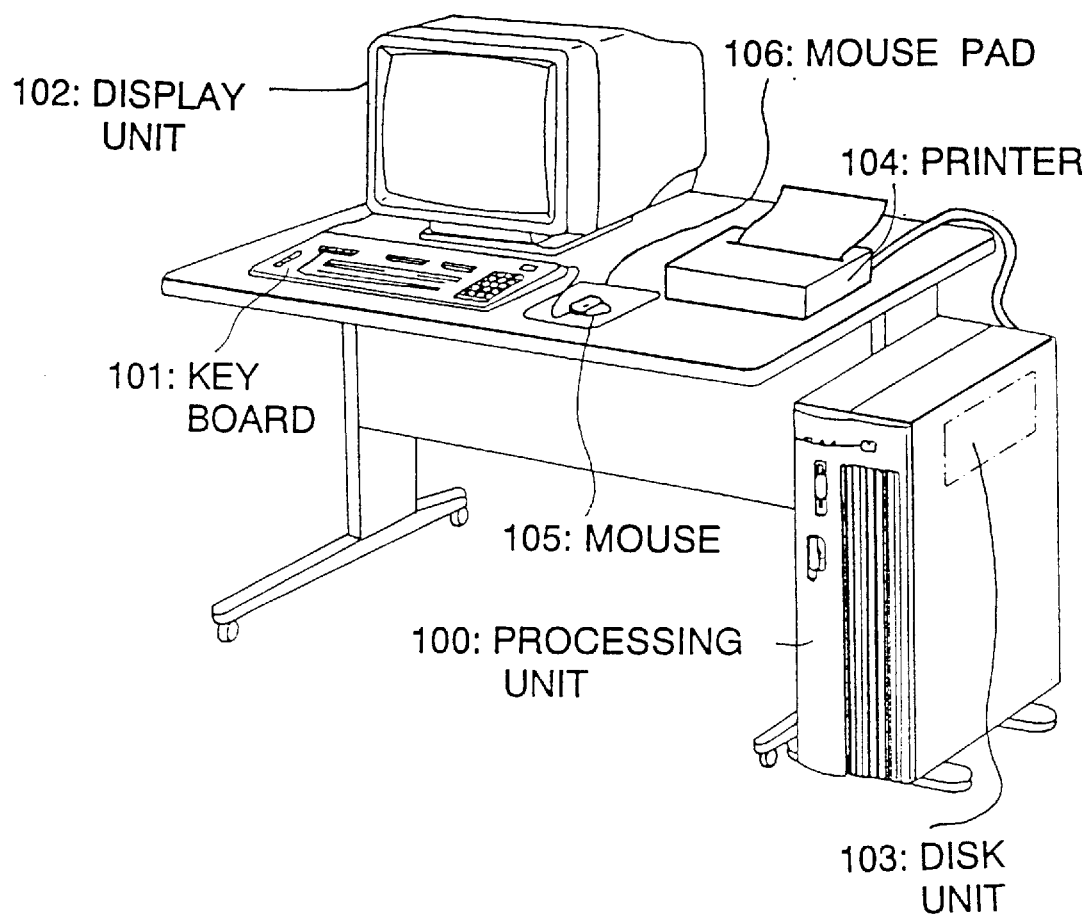
FIG. 1 is a perspective view illustrating a Chinese word inputting apparatus according to embodiment 1 of the present invention.

FIG. 1 is a perspective view showing a Chinese word inputting apparatus according to embodiment 1 of the invention. In FIG. 1, reference numeral 100 is a processing unit, 101 is a keyboard, 102 is a display unit, 103 is a disk unit, 104 is a printer, 105 is a mouse, and 106 is a mouse pad.

Figure 2:
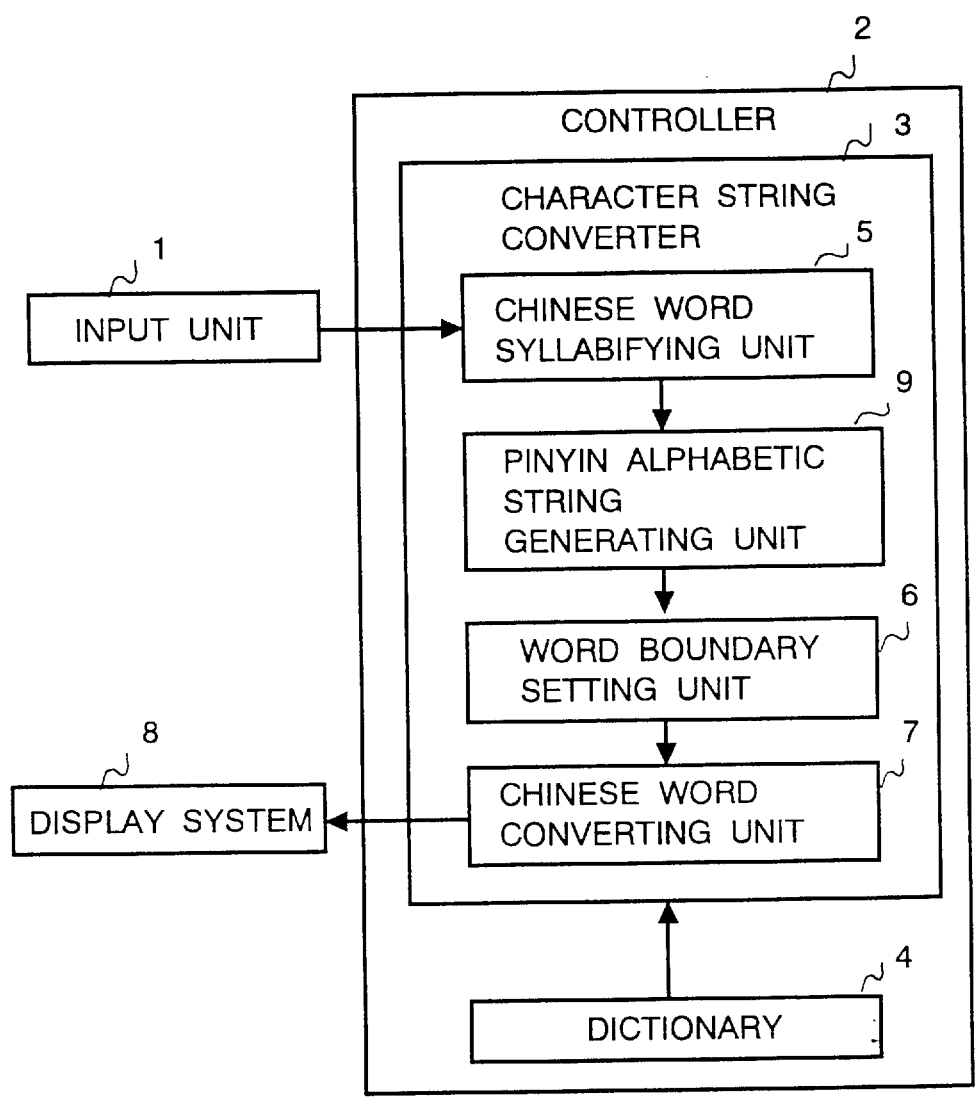
FIG. 2 is a block diagram of the Chinese word inputting apparatus according to embodiment 1 of the present invention.

FIG. 2 is a block diagram of the Chinese word inputting apparatus according to embodiment 1 of the present invention.

In FIG. 2, reference numeral 1 denotes an input unit. The input unit 1 includes the keyboard 101 which is provided with at least an alphabetical key, a numerical key, a conversion key, and a definition key.

Reference numeral 2 denotes a controller comprising a character string converter 3 and a dictionary 4. When a character string to be converted or a control command is input via the input unit 1, data processing described hereinafter is performed according to a control program.

FIG. 3 illustrates an embodiment of the dictionary 4. The dictionary 4 in FIG. 3 is a portion of a Pinyin-Chinese dictionary indicating correspondence of a Pinyin alphabetic string to a Chinese word.

The character string converter 3 comprises a Chinese word syllabifying unit 5, a Pinyin alphabetic string generating unit 9, a word boundary setting unit 6, and a Chinese word converting unit 7.

The Chinese word syllabifying unit 5 divides an input alphabetic string into syllable segments based on the principle of Chinese syllables. The syllable segments are further divided into an initial consonant or consonant cluster (hereinafter referred to as initial consonant(s)), and finals, or initial consonant(s) plus finals.

The Pinyin alphabetic string generating unit 9 analyzes the content of a subdivided syllable segment and generates a possible, standard Pinyin alphabetic string.

The word boundary setting unit 6 sets the boundary of words according to the Pinyin alphabetic string which has been divided into syllable segments.

The Chinese word converting unit 7 converts a possible Pinyin alphabetic string into a corresponding possible Chinese character string.

The display system 8 displays a converted Chinese character string, and includes the display unit 102.

An operation of this embodiment will now be described with reference to FIG. 1. The keyboard 101 is used as the input unit 1. Processing for the controller 2 is performed by the processing unit 100. Processing for the character string converter 3, including the Chinese word syllabifying unit 5, the Pinyin alphabetic string generating unit 9, the word boundary setting unit 6, the Chinese word converting unit 7 is performed by a central processing unit of the processing unit 100. The dictionary 4 is stored in a main memory or cache memory of the processing unit 100. A portion of the dictionary 4 can be stored in the disk unit 103. The display system 8 includes the display unit 102.

FIG. 4 illustrates an input example where an operator of the system shown in FIG. 1 is uncertain of the spelling of more than two, consecutive letters within a Pinyin alphabetic string he desires to enter. In this embodiment, the symbol "*" is used to represent more than two, consecutive uncertain letters. Symbols other than "*" can also be used.

In an input example 1(1) in FIG. 4, the operator intends to obtain a Chinese word "東京". The corresponding, correct Pinyin alphabetic string is "dongjing" as shown in (2). The operator, when he cannot remember the correct Pinyin alphabetic string, enters "do*ji*", using "*" to the uncertain portions as shown in (3).

An input example 2 in FIG. 4 shows a case where the operator enters "b*j*" as shown in (6), though he desires to enter a Chinese word "北京" as shown in (4), but is not sure of the spelling of the corresponding Pinyin alphabetic string.

As hereinafter described, a Chinese syllable is comprised of a combination of initial consonant(s) and finals. The above-mentioned "*" will be used when a portion or whole of the finals is unknown.

FIG. 5 is an input example where a Chinese word inputting operator is not sure of the spelling of one letter within the Pinyin alphabetic string he desires to enter. In this embodiment, the symbol "?" is used to represent one, uncertain letter. Symbols other than "?" can also be used. In an input example 3(1) in FIG. 5, the operator intends to obtain a Chinese word "長城". The correct Pinyin alphabetic string corresponding to (1) is "changcheng" as shown in (2). The operator, when he cannot remember the correct spelling of the Pinyin alphabetic string, enters "ch?ngch?ng", using "?" to each of the unknown letters within the Pinyin alphabetic string.

FIG. 6 is an example where a Chinese word inputting operator enters initials and tone data. The numeral indicates the tone data such as, for example, 0 to 4 (or 1 to 5) after the initial letter of a Pinyin alphabetic string corresponding to a desired Chinese character. Five kinds of other symbols can also be used to indicate the tone data. The tone data is rendered effective where the operator knows only an initial of a Pinyin alphabetic string and is not sure of the spelling of the remainder of the string, or where he desires to omit inputting an entire Pinyin alphabetic string. In an input example 4(1) in FIG. 6, the operator desires to obtain a Chinese word "日本". The corresponding, correct Pinyin alphabetic string is "riben" as shown in (2), where "ri" and "ben" correspond to each of the two Chinese characters respectively. In this case, the operator, when he knows only the initials of the Pinyin alphabetic string and is not sure of the remainder of the string, or he desires to omit inputting the entire Pinyin alphabetic string, enters "r4b3", using the initials and the tone data.

In an input example 5 in FIG. 6, the operator enters "h2k1g1s1" as shown in (6), while he desires to enter a Chinese word "航空公, 司" ("hangkonggongsi" in the Pinyin alphabetic string).

FIG. 7 and FIG. 8 are flow charts illustrating an operation of the disclosed embodiment.

The operation will be first explained with reference to the input example 1 in FIG. 4, where more than two, uncertain alphabetic strings exist.

At step 21, a Pinyin alphabetic string input from the keyboard 101 is read by the controller 2 of the processing unit 100. It is assumed herein that the input Pinyin alphabetic string is "do*ji*".

At step 22, the Chinese word syllabifying unit 5 divides the input Pinyin alphabetic string into Chinese syllable segments.

FIGS. 9 to 11 show lists of standard Pinyin alphabetic strings, indicating a correlation of initial consonant(s) and finals in forming a Chinese syllable. As shown in FIGS. 9 through 11, a Chinese syllable is comprised of a combination of initial consonant(s) and succeeding finals. There are 21 initial consonant(s) and 37 finals, but as illustrated in FIGS. 9 through 11, some combinations of initial consonant(s) and finals do not constitute syllables. A predetermined symbol "*" may be used in place of an uncertain portion of a final, however, initial consonant(s) must always be input correctly. Accordingly, division of an input Pinyin alphabetic string into syllable segments is performed so that each syllable segment begins with an initial consonant(s) in the Pinyin alphabetic string.

Figures 12, 13:
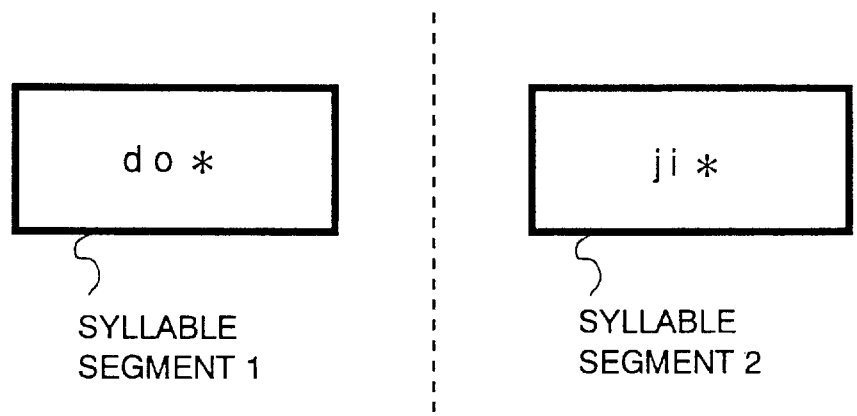
FIG. 12 shows an example where an input Pinyin alphabetic string is divided into syllable segments.
FIG. 13 shows a list of possible Pinyin alphabetic strings corresponding to "do*", generated by the Pinyin alphabetic string generating unit.

FIG. 12 illustrates an example where "do*ji*" is divided into syllable segments. "do*ji*" is divided into syllable segments, "do*" and "ji*", which are hereinafter referred to as a syllable portion 1 and a syllable portion 2, respectively. Division of a Pinyin alphabetic string into syllable segments has conventionally been performed to take advantage of the features of the Chinese language.

At step 23, the Pinyin alphabetic string generating unit 9 receives each of the divided syllable segments and determines whether each of the divided syllable segments is a standard Pinyin alphabetic string or not. If it is, the answer is YES, and the operation proceeds to step 25. If it includes other symbol such as "*" or "?" besides the Pinyin alphabetic string, the answer is NO, and the operation proceeds to step 24.

Since the syllable portion 1 "do*" includes the other symbol "*" besides the Pinyin alphabetic string, the answer is NO, and the operation goes to step 24. A further detailed operation flow of the Pinyin alphabetic string generating unit 9 at step 24 will be explained with reference to FIG. 8.

At step 51 in FIG. 8, it is determined if "*" is included in a syllable segment. If it is not, the answer is NO, and the operation branches off to step 53. The operation at steps following step 53 will be hereinafter described.

Since the syllable segments 1 "do*" includes "*", the answer is YES, and the operation proceeds to step 52.

At step 52, the Pinyin alphabetic string generating unit 9 replaces "*" in a syllable segment by a grammatically possible Pinyin alphabetic string, and generates a list of possible Pinyin alphabetic strings. The Pinyin alphabetic string generating unit 9 retains a table of initial consonant(s) to finals as shown in the lists of the standard Pinyin alphabetic strings in FIGS. 9 through 11. The Pinyin alphabetic string generating unit 9 retrieves the table according to the already-known portion of the input alphabetic string, or a combination of the initial consonant "d" and the finals beginning with "o" therefrom, and searches for a grammatically possible Pinyin alphabetic string. The maximum number of syllables made from a combination of initial consonant(s) and finals are 21×37. However, as shown in FIGS. 9 through 11, there are cases where a combination of initial consonant(s) and finals does not constitute a syllable. Accordingly, the number of the possible Pinyin alphabetic strings is not as large as 21×37.

FIG. 13 illustrates a list of possible Pinyin alphabetic strings generated by the Pinyin alphabetic string generating unit 9. The possible Pinyin alphabetic strings corresponding to "do*" are "dong" and "dou". After the completion of step 52, the operation proceeds to step 25 in FIG. 7.

At step 25, it is determined if the syllable segment is a final one of the Pinyin alphabetic string, and if the answer is YES, the operation proceeds to step 26. Since the syllable segment is not a final one in this case, the answer is NO, and the operation returns to step 23.

Figures 14, 15:
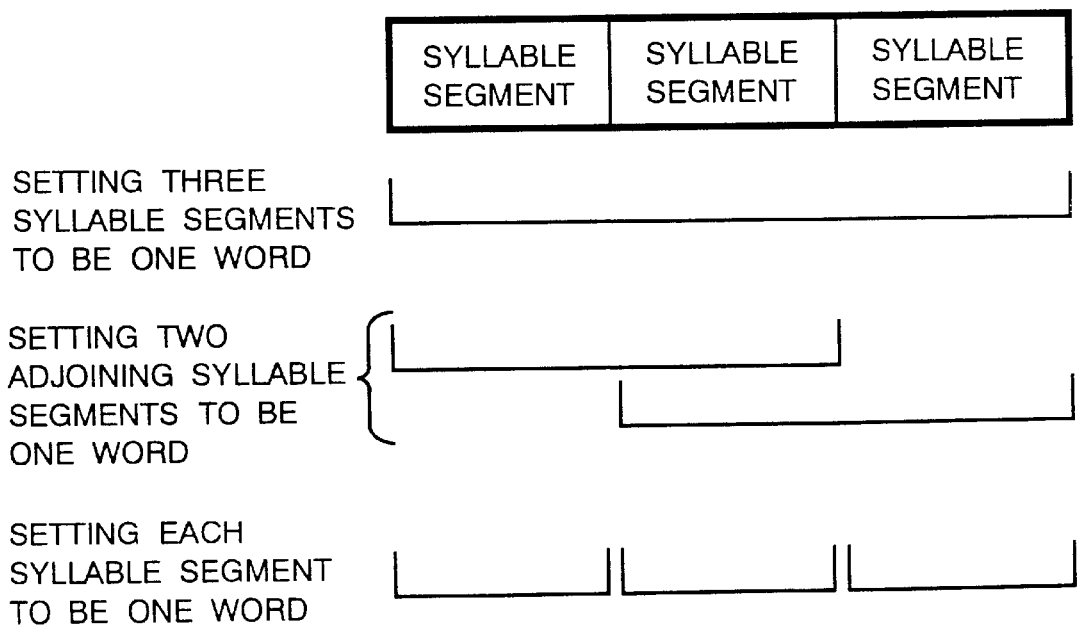
FIG. 14 shows a list of possible Pinyin alphabetic strings corresponding to "ji*", generated by the Pinyin alphabetic string generating unit.
FIG. 15 shows methods for setting a word boundary by the word boundary setting unit.

At step 23, the Pinyin alphabetic string generating unit 9 receives the succeeding syllable segment and determines whether it is comprised solely of a Pinyin alphabetic string or not. Since the syllable portion 2 "ji*" is not comprised of a Pinyin alphabetic string solely, the same processing as described before is performed, and a list of possible Pinyin alphabetic strings illustrated in FIG. 14 is obtained.

For each of the syllable segments of an input Pinyin alphabetic string, the operation from steps 23 through 25 is repeated, and after completion, the operation goes to step 26. In the case of "do*ji*", as the operation for both the syllable segments 1 and 2 has been completed, the operation proceeds to step 26.

With reference to the operation after step 26, it is not the essential point of the present invention whose operating advantage resides in replacing an uncertain character by a predetermined symbol. The operations of step 26 and thereafter will therefore be made only roughly.

At step 26, the word boundary setting unit 6 sets the word boundary. The word boundary will now be described with reference to FIG. 15. In the case of a word which is comprised of three syllable segments, there are provided the following three methods for setting its word boundary:

(1) Setting all three syllable segments to be one word
(2) Setting the adjoining two syllable segments among the three to be one word
(3) Setting each syllable segment to be one word In this embodiment, at step 26 and step 27, the word boundary setting method is adopted wherein the longest length of a combination of syllable segments is set to be one word boundary. The operation is then performed at steps 26 through 28, and a list of possible Chinese words is generated. At step 29, when it is judged that the most suitable Chinese word is not included in the list, the operation returns to step 26 again. At step 26, the previous word boundary setting is reviewed, the combination of syllables which is one syllable less than the previous one is set to be one word, and a possible word is searched again.

When a word is comprised of three syllable segments as shown in FIG. 15, for example, the combination of three syllable segments is first set to be one word, and for which a suitable Chinese word is searched. When the suitable word is not found, then, a combination of two syllable segments is set to be one word, and a possible word is searched again. In this case, when the suitable word is not found again, each syllable segment is set to be one word. When each syllable segment is set to be one word and there are no inputting errors, the suitable Chinese word may be found without fail.

Figure 16:
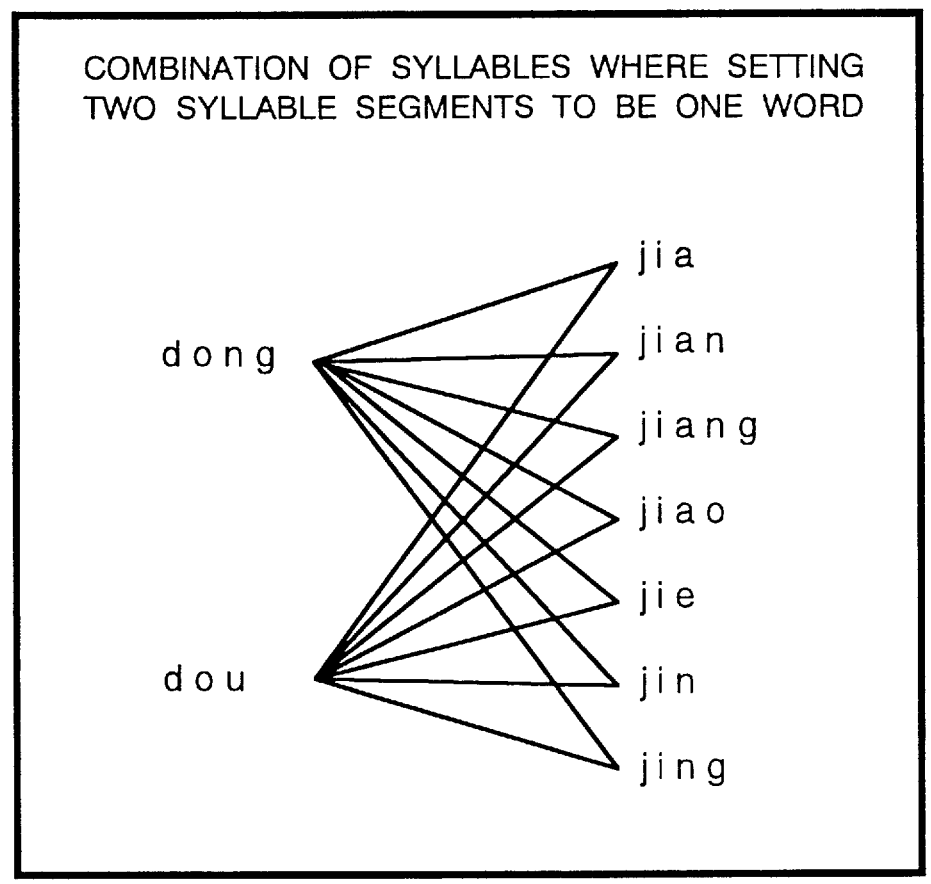
FIG. 16 shows a combination of Pinyin alphabetic strings.

In the case of "do*ji*", the two syllable segments are first set to be one word at step 26. Combinations of the Pinyin alphabetic strings are shown in FIG. 16. The number of combinations of the syllable segment 1 and the syllable segment 2 becomes 14 (2×7).

At step 27, the Chinese word converting unit 7 generates a list of possible Chinese words for the combinations of possible Pinyin alphabetic strings, referring to the dictionary 4. For each of the 14 combinations of Pinyin alphabetic strings as shown in FIG. 16, the dictionary 4 is referred to, and it is examined whether the corresponding Chinese words exist or not. When the corresponding Chinese words exist, they are included in the list of possible Chinese words. FIG. 17 illustrates a Chinese word list generated. The Pinyin alphabetic strings shown in parenthesis are only for reference, and are not actually displayed.

At step 28, the Chinese word converting unit 7 selects and displays a suitable Chinese word on the display unit 102. In this situation, to select the most suitable word, priority should be placed on either a relationship with words which have been previously referred to, or words frequently used. Alternatively, the entire list or a portion of the list of possible Chinese words is displayed on the display unit 102, among which the user may select the most suitable one at step 29.

At step 29, the user judges whether a possible Chinese word displayed on the display unit 102 is the intended one or not. While each of the possible Chinese words is displayed on the display unit 102, the user continues judging until he identifies and selects the most suitable word displayed, or until no more possible Chinese words of the list appear on the screen. When the most suitable word is not found, the operation returns to step 26.

In this example, since "東京" is the intended Chinese word, the user selects it from the display, and the operation proceeds to step 30.

At step 30, the word boundary setting unit 6 determines whether the last syllable segment is included in the word boundary being processed. When the answer is NO, the operation returns to step 26, and processing is performed again for the remainder of the syllable segments at subsequent steps so as to find a suitable Chinese word. At step 30, when the answer is YES, the operation is finished. In this example, since the last syllable segment is included, the operation is finished.

Word processing performed in the situation where an uncertain letter in the Pinyin alphabetic string is indicated by a symbol such as, for example, "?", will now be described with reference to the input example 3 in FIG. 5. The description of similar processing to the example using the symbol "*" will be omitted.

At step 21, "ch?ngch?ng" is input, and is divided into syllable segments "ch?ng" and "ch?ng" at step 22. At step 23, it is examined whether a symbol besides the Pinyin alphabetic string is included or not. In this case, "?" is included, the operation proceeds to step 24.

Now, detailed description of the processing at step 24 will be made with reference to FIG. 8.

At step 51, the Pinyin alphabetic string generating unit 9 determines whether "*" is included in the syllable segment or not. The answer is NO, and the operation proceeds to step 53. At step 53, the Pinyin alphabetic string generating unit 9 determines whether "?" is included or not. If the answer is NO, error processing is performed at step 55.

Since "?" is included in "ch?ng", the answer is YES, and the operation shifts to step 54.

At step 54, the Pinyin alphabetic string generating unit 9 retrieves the table which has been described before, and replaces "?" in the syllable segment by one grammatically possible Pinyin alphabetic writing, and generates a list of possible Pinyin alphabetic strings.

FIG. 18 illustrates a list of possible Pinyin alphabetic strings generated by the Pinyin alphabetic string generating unit 9. The Pinyin alphabetic strings of "chang", "chong", "cheng" are listed, corresponding to "ch?ng".

When step 54 is finished, the operation proceeds to step 25 in FIG. 7.

The second syllable segment, "ch?ng" is the same as the first syllable segment. Accordingly, a list of possible Pinyin alphabetic strings is as shown in FIG. 18.

Processing at steps 26 through 30 is the same as previously described before.

FIG. 19 illustrates a list of Chinese words displayed when the two syllable segments are set to be one word.

Now, the operation of inputting an initial with tone data will be described.

A processing performed when inputting an initial with tone data will be described with reference to the input example 4 in FIG. 6.

At step 21, the Pinyin alphabetic string input via the keyboard 101 of the input unit 1 is entered to the controller 2. In this example, the input Pinyin alphabetic string is "r4b3".

At step 22, the Chinese word syllabifying unit 5 divides the input Pinyin alphabetic string into Chinese syllable segments. In dividing into syllable segments, the Chinese word syllabifying unit 5 recognizes an initial appended by tone data and divides the Pinyin alphabetic string into "r4" and "b3" according to the system of the present invention wherein an initial and tone data is set to be one syllable segment.

At step 23, the Pinyin alphabetic string generating unit 9 receives the divided syllable segment from its beginning, and determines whether it is comprised solely of the Pinyin alphabetic string or not. "r4", which is an initial and tone data, is determined to be a Pinyin alphabetic string. Therefore, the answer is YES, and the operation proceeds to step 25.

At step 25, it is determined whether the syllable segment is a final one or not. In this case, the answer is NO, and the operation returns to step 23.

At step 23, the Pinyin alphabetic string generating unit 9 receives the succeeding syllable segment "b3" and determines if it is comprised solely of the Pinyin alphabetic string. Since "b3" is the Pinyin alphabetic string, the operation is forwarded to step 25.

At step 25, when it is determined that all syllable segments have been examined, the operation goes to step 26.

At step 26, the word boundary setting unit 6 sets the word boundary. In the case of "r4b3", the two syllable segments are first set to be one word.

At step 27, the dictionary 4 illustrated in FIG. 20 is referred to, and a list of possible Chinese words is generated. A form of the table illustrated in FIG. 21 can also be used as the dictionary 4. The items of "the Pinyin alphabetic strings" in FIG. 20 and FIG. 21 are only for reference, and are not actually included in the dictionary. The advantage of the dictionary illustrated in FIG. 20 is that, since it separately retains initial information and tone data as a search key, the initial information can be used alone even when only the initials of the Pinyin alphabetic string corresponding to each of Chinese characters have been input without tone data. However, it is required that the input alphabetic string be processed into the alphabetic string comprised of the initials alone, when the alphabetic string is input in the form of an initial with tone data. The dictionary illustrated in FIG. 21 retains an initial and tone data as a search key, the input alphabetic string can be used for a dictionary search without being processed. A Chinese word corresponding to "r4b3" is "日本" according to the dictionary 4, and it is included in the list of Chinese words.

At step 28, the Chinese word converting unit 7 selects a suitable Chinese word from the list of Chinese words and displays it on the display unit 102. In this case, "日本" is displayed.

When inputting an initial with tone data, the tone data can be used to reduce the number of possible Chinese words to be displayed, and a conversion result of "日本" can be obtained.

As described above, when the user has limited knowledge of the Chinese Pinyin system, and is not sure of the correct spelling of a Pinyin alphabetic string to be entered, symbols such as "*", and "?" can be used to replace an uncertain portion of the Pinyin alphabetic string. Abbreviated input of the Pinyin alphabetic string is also possible, using an initial and tone data. A Chinese word input apparatus with good operability for the user can be provided accordingly.

In the system of the present invention, an input Pinyin alphabetic string is divided into syllable segments, each of which corresponding to one Chinese character, and the above-mentioned processing is performed. Consequently, for conversion of a word comprised of more than two uncertain letters into a Chinese character string, three kinds of inputting systems using "*", "?", and "an initial and tone data" may be applied individually or simultaneously.

FIG. 22 illustrates examples using three kinds of inputting systems individually or simultaneously.

An input example 6 of FIG. 22 illustrates a Pinyin alphabetic string which is to be converted into two Chinese characters with the symbol "*", indicating that one unknown letter string is used in place of the uncertain Pinyin alphabetic string corresponding to one Chinese character of the two.

An input example 7 illustrates a Pinyin alphabetic string which is to be converted into two Chinese characters with the symbol "?", indicating that one unknown letter is used in place of the uncertain Pinyin alphabetic writing corresponding to one Chinese character of the two.

An input example 8 shows a Pinyin alphabetic string which is to be converted into three Chinese characters with the symbol "*" indicating an unknown letter string and the symbol "?" indicating an unknown letter used together in place of the uncertain portions of the Pinyin alphabetic string corresponding to two Chinese characters of the three.

An input example 9 shows a Pinyin alphabetic string which is to be converted into four Chinese characters with two initials of the Pinyin alphabetic string respectively corresponding to the first and second Chinese characters of the four input, and the first initial is appended by tone data.

As described hereinbefore, the present invention can provide a Chinese word inputting apparatus and a Chinese word processing method which enable easy, efficient input by an operator having limited knowledge of the Chinese Pinyin system e.g., where the operator's knowledge of the finals of a Chinese syllable is insufficient.

Further, the present invention can provide a Chinese word inputting apparatus and a Chinese word processing method that are compatible with conventional Pinyin inputting systems, and which enable easy and efficient input for both conventional Pinyin inputting systems and systems in accordance with embodiments of the present invention.

Embodiment 2

The second embodiment of the present invention is directed to a Japanese word processing apparatus. A Japanese sentence can be represented by a combination of three kinds of character forms including hiragana, katakana, and kanji. The Chinese system for inputting a Pinyin alphabetic string is similar to systems for inputting a hiragana character string, katakana character string, or Roman letter string in Japanese. In this embodiment, it is assumed that only nouns are converted, and the following description is made with reference to examples of converting hiragana into kanji, or converting a Roman letter or Roman letters into kanji.

FIG. 23 illustrates an input example where Japanese hiragana is converted into kanji. In FIG. 23, (1) shows the case where a Japanese word inputting operator intends to obtain a Japanese kanji "海外". (2) denotes a hiragana character string corresponding to (1). The operator, when he cannot remember the hiragana character string accurately, enters "かいが?", using "?" to an uncertain character as shown in (3).

Figure 24:
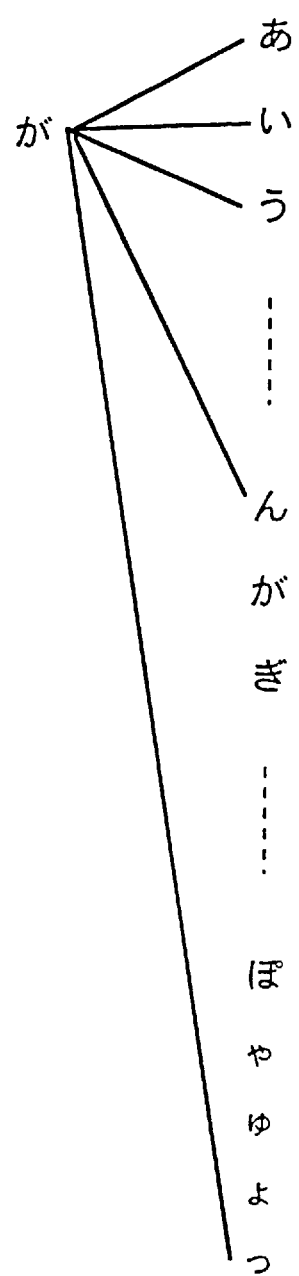
FIG. 24 shows an example of possible hiragana character strings displayed, corresponding to "か?"

In this embodiment of the present invention, a Japanese word processing apparatus is provided which converts a hiragana character string into a corresponding kanji character string in a similar manner as in the Chinese word inputting apparatus in accordance with the first embodiment of the present invention. FIG. 24 shows a list of possible hiragana character strings displayed when converting "?" into a corresponding hiragana character string. In listing possible hiragana character strings, 74 characters including hiragana characters from "あ" through "ん", "が", "ぎ", "ぽ", "ゃ", "ゅ", "ょ", "っ", etc. are possibly displayed in view of the grammar for the Japanese language. The dictionary stores hiragana and its corresponding kanji. FIG. 25 illustrates an example of a Japanese hiragana-kanji dictionary.

FIG. 26 illustrates an input example where Roman letters are converted into kanji. The Roman letter string corresponding to Chinese characters "海外" is "kaigai" as shown in (2) of FIG. 26. The operator, when he cannot remember the Roman letter string accurately, enters "kaig*", using "*" to an uncertain letter string as shown in (3). When listing possible Roman letter strings, the possible Roman letter strings should be comprised of the letters selected from 26 Roman letters. FIG. 27 shows an example of a Roman letter-kanji dictionary.

As described before, when the hiragana character string or Roman letter string is uncertain, a symbol such as "*" or "?" can be used in place of an uncertain hiragana character string.

In a language such as Chinese or Japanese which is represented by a plurality of character forms, when a character string represented by the first character form to be input is uncertain, a symbol can be used in place of the uncertain character string, and a possible character string represented by the second character form can be obtained. According to the present invention, a language processing apparatus which can be easily operated by the user can be provided. In the present embodiment, symbols such as "*" and "?" are used in place of the uncertain character strings. However, other symbols can also be used.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and the equivalents thereto.

What is claimed is:

1. A Chinese word inputting apparatus for inputting an alphabetic string and for converting the alphabetic string into a Chinese character string, comprising:
   (a) input means for inputting the alphabetic string, the alphabetic string having an unknown portion, and for inputting a symbol indicating an unknown alphabetic string in place of the unknown portion of the alphabetic string;
   (b) Chinese word syllabifying means for dividing the alphabetic string input by the input means into Chinese syllable segments;
   (c) alphabetic string generating means for determining if each of the Chinese syllable segments is comprised of a standard alphabetic string, so as to output the standard alphabetic string when each of the Chinese syllable segments is comprised of a standard alphabetic string, and to generate and output a possible alphabetic string when the symbol indicating an unknown alphabetic string is used in place of the unknown portion of the input alphabetic string;
   (d) dictionary means for storing both Chinese character strings and alphabetic information;
   (e) Chinese word converting means for converting the standard alphabetic string into a possible Chinese string and for converting the possible alphabetic string into a possible Chinese character string by referring to the dictionary means; and
   (f) output means for outputting the possible Chinese character strings converted by the Chinese word converting means.

2. A Chinese word inputting apparatus for inputting an alphabetic string having one or more letters and for converting the alphabetic string into a Chinese character string, comprising:
   (a) input means for inputting the alphabetic string, the alphabetic string having an unknown letter, and for inputting a symbol indicating an unknown letter in place of the unknown letter of the alphabetic string;
   (b) Chinese word syllabifying means for dividing the alphabetic string input by the input means into Chinese syllable segments;
   (c) alphabetic string generating means for determining if each of the Chinese syllable segments is comprised of a standard alphabetic string, so as to output the standard alphabetic string when each of the Chinese syllable segments is comprised of a standard alphabetic string, and to generate and output a possible alphabetic string when the symbol indicating an unknown letter is used in place of the unknown letter of the input alphabetic string;
   (d) dictionary means for storing both Chinese character strings and alphabetic information;
   (e) Chinese word converting means for converting the standard alphabetic string into a possible Chinese character string and for converting the possible alphabetic string into a possible Chinese character string by referring to the dictionary means; and
   (f) output means for outputting the possible Chinese character strings converted by the Chinese word converting means.

3. A Chinese word inputting apparatus for inputting an alphabetic string and for converting the alphabetic string into a Chinese character string, comprising:
   (a) input means for inputting the alphabetic string, including an initial letter of the alphabetic string and a symbol indicating tone data appended to the initial letter of the alphabetic string;
   (b) Chinese word syllabifying means for dividing the alphabetic string input by the input means into Chinese syllable segments;
   (c) dictionary means for storing both Chinese character strings and alphabetic information;
   (d) Chinese word converting means for converting the alphabetic string into a possible Chinese character string, and for converting the initial letter and the tone data of the alphabetic string into a possible Chinese character string by using the tone data to reduce a number of possible corresponding Chinese characters; and
   (e) output means for outputting the possible Chinese character strings converted by the Chinese word converting means.

4. A Chinese word processing method for inputting an alphabetic string and for converting the alphabetic string into a Chinese character string, comprising steps of:
   (a) inputting the alphabetic string, the alphabetic string having an unknown portion, and inputting a symbol indicating an unknown alphabetic string in place of the unknown portion of the alphabetic string;
   (b) dividing the alphabetic string into Chinese syllable segments;
   (c) determining whether each of the Chinese syllable segments is comprised of a standard alphabetic string so as to output the standard alphabetic string when each of the Chinese syllable segments is comprised of a standard alphabetic string, and to generate and output a possible alphabetic string when the symbol indicating an unknown alphabetic string is used in place of the unknown portion of the input alphabetic string;
   (d) converting the standard alphabetic string into a possible Chinese character string and converting the possible alphabetic string into a possible Chinese character string by referring to dictionary means containing both Chinese character strings and alphabetic information; and
   (e) outputting the possible Chinese character strings.

5. A Chinese word processing method for inputting an alphabetic string and for converting the alphabetic string into a Chinese character string, comprising steps of:
   (a) inputting the alphabetic string, the alphabetic string having one or more letters including an unknown letter, and inputting a symbol indicating an unknown letter in place of the unknown letter of the alphabetic string;
   (b) dividing the alphabetic string into Chinese syllable segments;
   (c) determining whether each of the Chinese syllable segments is comprised of a standard alphabetic string so as to output the standard alphabetic string when each of the Chinese syllable segments is comprised of a standard alphabetic string, and to generate and output a possible alphabetic string when the symbol indicating an unknown letter is used in place of the unknown letter of the alphabetic string;
   (d) converting the standard alphabetic string into a possible Chinese character string and converting the possible alphabetic string into a possible Chinese character string by referring to dictionary means containing both Chinese character strings and alphabetic information; and (e) outputting the possible Chinese character strings.

6. A Chinese word processing method for inputting an alphabetic string and for converting the alphabetic string into a Chinese character string, comprising steps of:
(a) inputting the alphabetic string, including an initial letter of the alphabetic string and a symbol indicating tone data appended to the initial letter of the alphabetic string;
(b) dividing the alphabetic string into Chinese syllable segments;
(c) converting the alphabetic string into possible Chinese character strings by using the initial letter and the tone data to reduce a number of possible Chinese character strings; and
(d) outputting the possible Chinese character strings.

7. A language processing apparatus for processing a language represented by at least a first character form and a second character form, comprising:
(a) input means for inputting a character string having an unknown portion, represented by the first character form, the character string including a symbol in place of the unknown portion;
(b) character string generating means for determining whether the symbol indicating an unknown portion is used in the character string input by the input means, for replacing the symbol by a grammatically possible character string of the first character form to create a possible character string;
(c) dictionary means for storing character strings of the first character form and corresponding character strings of the second character form;
(d) converting means for converting the possible character string represented by the first character form obtained by the character string generating means into a corresponding possible character string represented by the second character form by referring to the dictionary means; and
(e) outputting the corresponding possible character string represented by the second character form converted by the converting means.

8. The language processing apparatus according to claim 7, further comprising syllabifying means for dividing the character string, input by the input means and represented by the first character form, into syllables corresponding to a character string represented by the second character form.

9. The language processing apparatus according to claim 7 or claim 8, wherein the character string represented by the first character form includes a known character string and a symbol indicating an unknown character string in place of an unknown portion of the character string.

10. The language processing apparatus according to claim 9, wherein the symbol indicating the unknown character string corresponds to a single character.

11. The language processing apparatus according to claim 10 wherein the language of the language processing apparatus is Chinese, wherein the first character form is Pinyin alphabetic writing, wherein the dictionary means stores Pinyin alphabetic strings and Chinese character strings corresponding to Pinyin alphabetic strings, and wherein the converting means converts a possible Pinyin alphabetic string into a corresponding Chinese character string by referring to the dictionary means.

12. The language processing apparatus according to claim 11, wherein the character string generating means includes a table for storing combinations of grammatically possible Pinyin alphabetic strings and the character string generating means generates a grammatically possible Pinyin alphabetic string, by using the table.

13. The language processing apparatus according to claim 10, wherein the language of the language processing apparatus is Japanese, and wherein the first character form is Japanese hiragana.

14. The language processing apparatus according to claim 9, wherein the symbol indicating the unknown character string corresponds to a plurality of characters.

15. The language processing apparatus according to claim 8, wherein the language of the language processing apparatus is Chinese, wherein the input means inputs an initial letter of a Pinyin alphabetic string and a symbol indicating tone data appended to the initial letter of the Pinyin alphabetic string, wherein the dictionary means stores Chinese character strings corresponding to initial letters of Pinyin alphabetic strings and tone data, and wherein the converting means converts the initial letter of the Pinyin alphabetic string and the tone data into a possible Chinese character string.

16. A language processing method for processing a language that may be represented by at least a first character form and a second character form, comprising steps of:
(a) inputting a character string represented by the first character form, the character string having a known portion including at least one character and an unknown portion including a symbol indicating an unknown character string;
(b) dividing the character string into syllable segments;
(c) determining whether the symbol indicating an unknown character string is used in the character string input by the step of inputting and generating a grammatically possible character string represented by the first character form when the symbol is used;
(d) converting the grammatically possible character string represented by the first character form generated by the step of generating a grammatically possible character string into a corresponding character string represented by the second character form by referring to a dictionary that contains character strings represented by the first character form and corresponding character strings represented by the second character form; and
(e) outputting the corresponding character string represented by the second character form converted by the step of converting.

17. The language processing method according to claim 16, wherein in the step of inputting the symbol indicating an unknown character string corresponds to a single character.

18. The language processing method according to claim 16, wherein in the step of inputting the symbol indicating an unknown character string corresponds to a plurality of characters.

19. The language processing method according to claim 16, wherein the step of inputting inputs a Pinyin alphabetic writing as the first character form, and wherein the step of converting converts the Pinyin alphabetic string into a Chinese character string corresponding to the Pinyin alphabetic string.

* * * * *